July 15, 1941.  J. C. STEINER  2,249,187

CLUTCH

Filed March 23, 1940

INVENTOR.
JOSEPH C. STEINER
BY Albert J. McCauley
ATTORNEY.

Patented July 15, 1941

2,249,187

UNITED STATES PATENT OFFICE 2,249,187

CLUTCH

Joseph C. Steiner, St. Louis, Mo.

Application March 23, 1940, Serial No. 325,565

9 Claims. (Cl. 192—18)

This invention relates to clutches for the transmission of power, one of the objects being to produce a clutch having a simple and effective actuating means which serves as a combined clutch shifter and brake adapted to shift one of the clutch members out of driving engagement with the other clutch member and thereafter prevent rotation of the shifted clutch member.

Another object of this invention is to practically eliminate the abrasive friction which usually occurs at various places when a driven clutch member is separated from a driving clutch member.

A further object is to produce a small, compact and inexpensive clutch device, adapted to be employed in a relatively small space, such compactness being quite important in many installations where the operating conditions provide very little space for the desired clutch device. For example, in some cases a substantial advantage can be gained by locating a clutch on the extended end of an engine shaft, which receives a pulley or toothed wheel, but such shaft extensions are usually too short to receive the various elements of an ordinary clutch device. The entire clutch structure herein shown, including the clutch members as well as the toothed wheel or pulley, and the manually operated clutch shifting device can be very readily installed around the short extension of an engine shaft. This overcomes the practical mechanical difficulties heretofore involved in finding ample space for the clutch, at the same time locating the clutch shifter where it can be conveniently operated. A further advantage appears in locating the small clutch at the source of power where the stresses are usually comparatively low, instead of beyond the power transmission gearing where a stronger clutch would be required.

More specifically stated, an object is to produce a simple new clutch structure having all of these advantages, the several elements, including the clutch shifter, being arranged to produce a very compact clutch device wherein the usual abrasive friction is almost entirely eliminated.

With the foregoing and other objects in view, the invention comprises the novel construction, combination and arrangement of parts hereinafter more specifically described and shown in the accompanying drawing, which illustrate one form of the invention. However, it is to be understood that the invention comprehends changes, variations and modifications within the scope of the claims hereunto appended.

Figure 1:
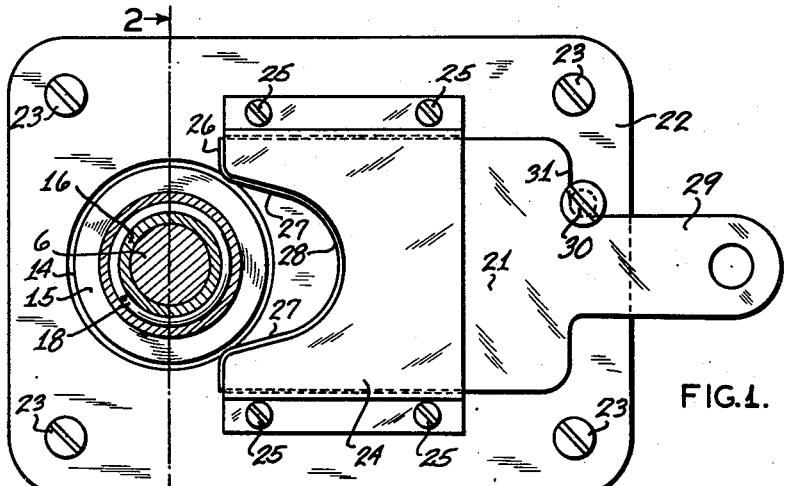
Fig. 1 is a front view, partly in section, illustrating a combined clutch shifter and brake embodying the features of this invention.
Figure 2:
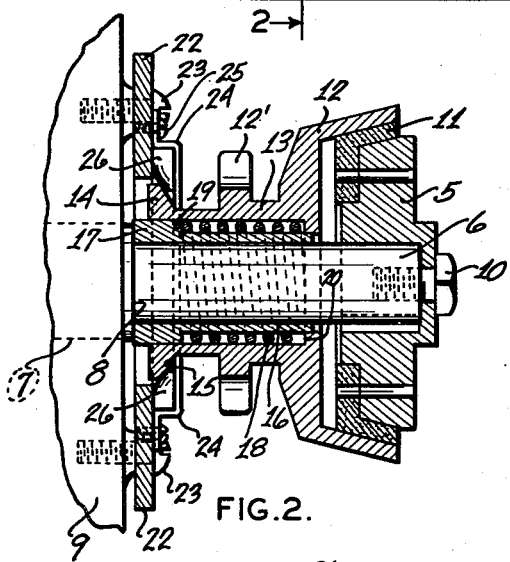
Fig. 2 is a section taken approximately on the line 2—2 in Fig. 1.

To illustrate one form of the invention, I have shown a friction clutch including a driving clutch member 5, fixed to the reduced end portion 6 of an engine shaft 7, said reduced portion extending from a shoulder 8 near a side wall 9 of an engine. The driving clutch member 5 may be secured to the end of the shaft by a screw 10 and provided with friction material 11 adapted to engage a driven clutch member 12.

This driven clutch member 12 is provided with a hub 13 loosely surrounding the reduced portion of the shaft. The hub 13 is provided with a friction member 14 having an annular beveled face 15 and a driven sprocket wheel 12' interposed between the clutch member 12 and friction member 14.

An anti-friction bearing in the form of a sleeve 16 separates the driven clutch member 12 from the reduced portion 6 of the driving shaft. This bearing 16 is provided with a thrust member 17 at one end, engaging the shoulder 8 on the driving shaft. A spring 18 surrounding the sleeve 16 is interposed between a spring seat 19 on the sleeve and a spring seat 20 on the driven clutch member 12. This spring 18 yieldingly holds the thrust member 17 in engagement with the shoulder 8 on the driving shaft, and also tends to force the driven clutch member 12 toward the driving clutch member.

Figure 3:
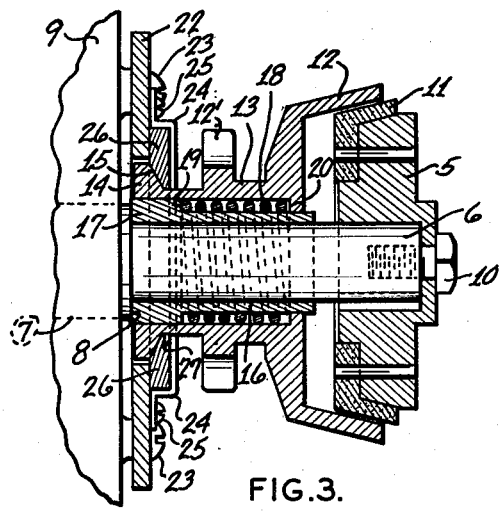
Fig. 3 is a view similar to Fig. 2, showing the clutch members separated from each other.

When the clutch members are in engagement and the various elements thereof rotate as a unit, the bearing 16 merely supports the driven clutch member 12 on the driving shaft. However, when the driven clutch member is disengaged from the driving clutch member 5, as shown in Fig. 3, the driving shaft and clutch member 5 are free to rotate without imparting motion to said driven clutch member. The anti-friction bearing 16 which is loosely mounted on the reduced portion 6 of the driving shaft permits said shaft to rotate while said bearing and driven clutch member are stationary. The bearing 16 is preferably made of a metal impregnated with oil, such as the metal commonly known as oilless bronze, to reduce the friction between the driving shaft and said bearing.

I will now refer to the means for shifting the driven clutch member 12 out of engagement with the driving clutch member 5. To illustrate this feature, I have shown a manually operated combined clutch shifter and brake including a member 21 slidably mounted on a support 22 which surrounds the driving shaft and is secured to the side wall of the engine by means of screws 23. The slidable member 21 is preferably movable on the support 22 in a substantially straight line at a right angle to the axis of the driving shaft.

The means for guiding said slidable member 21 in said straight line at a right angle to the axis of said driving shaft includes a guide member 24 extending over and engaging the outer face and opposite side edges of the slidable member 21, said guide member 24 being secured to the support 22 by screws 25.

The slidable member 21 has a bifurcated portion providing oppositely disposed spaced arms 26 having diverging inner edges 27 or cam faces (Figs. 1 and 4) adapted to progressively engage diametrically opposite beveled faces of the friction member 14 to shift the driven clutch member away from said driving clutch member.

Figure 4:
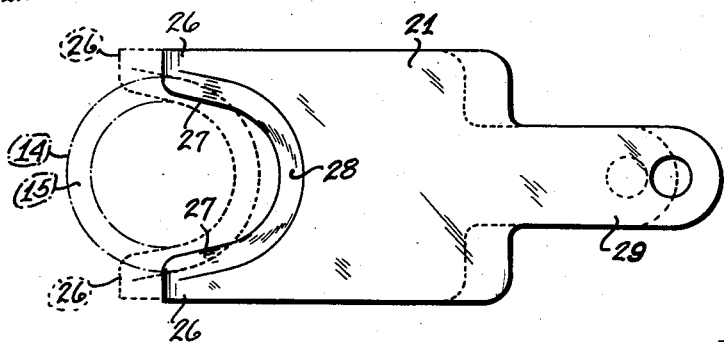
Fig. 4 is a detail view showing the rear face of the combined brake and clutch shifter.

Attention is now directed to the action of the clutch shifter in disengaging the clutch members. Fig. 1 shows the inoperative position of the clutch shifter when it is out of contact with the friction member 14 to permit driving engagement of the clutch members. As the shifter is moved to the left from the position shown in Fig. 1, the diverging edges 27 of the arms 26 engage the beveled face 14 of the friction member and progress thereon toward the axis of said friction member to shift the driven clutch member away from said driving clutch member. In Fig. 4 I have shown in full lines the position of the shifter as the diverging edges 27 are just moved into contact with the beveled face 15 of the friction member. From this position the shifter is moved to the position shown by dotted lines in Fig. 4 to disengage the clutch members. As the shifter moves from the position shown by full lines in Fig. 4 to the position shown by dotted lines, it will be observed that the diverging edges 27 of the arms 26 form areas of contact with the beveled face 15 of the friction member which progress toward the axis of the friction member. This progressive contact between the shifter arms 26 and friction member 14 provides the desired shifting of the friction member to disengage the driven clutch member from the driving clutch member.

As shown in Fig. 4, the inner edge of the bifurcated portion of the shifter is provided with a continuous beveled braking face 28 extending from the end portion of one of the arms 26 to the end portion of the other arm. This beveled braking face 28 conforms to and is adapted to engage the annular beveled face 15 of the friction member 14 to prevent rotation thereof when the driven clutch member is disengaged from the driving clutch member.

The slidable member 21 may be provided with an extended operating handle 29, for slidably moving the bifurcated portion of the shifter toward and away from said beveled annular friction member. To limit the movement of the clutch shifter away from the beveled annular friction member, I have shown the support 22 as provided with a screw 30 adapted to be struck by a shoulder 31 on the shifter.

It will be observed that I have produced a very small, compact and inexpensive clutch device wherein a simple clutch shifter is employed to effectively shift the driven clutch member out of engagement with the driving clutch member and thereafter provide a brake to prevent undesirable rotation of the driven clutch member. Moreover, the arrangement of the anti-friction bearing with respect to the clutch members, eliminates undesirable friction between the various elements of the clutch when the driven clutch member is disengaged from the driving clutch member and subjected to the braking action of the beveled braking face 28 of the shifter.

I claim:

1. In a clutch device provided with a driving clutch member and a shiftable driven clutch member, a rotary friction member having an annular beveled friction face, said rotary friction member being secured to said driven clutch member, a manually operated combined clutch shifter and brake including a slidable friction member having a friction face adapted to engage said annular beveled friction face and progressively advance toward the axis of said rotary friction member to shift the driven clutch member away from said driving clutch member, and means for guiding said slidable friction member in a substantially straight line, said friction face of said slidable member being at an angle to said straight line.

2. In a clutch device provided with a driving clutch member and a shiftable driven clutch member, a rotary friction member having an annular beveled friction face, said rotary friction member being secured to said driven clutch member, a manually operated combined clutch shifter and brake including a slidable friction member having a friction face adapted to engage said annular beveled friction face and progressively advance toward the axis of said rotary friction member to shift the driven clutch member away from said driving clutch member, and means for guiding said combined clutch shifter and brake in a substantially straight line at a right angle to the axis of said rotary friction member.

3. In a clutch device provided with a driving clutch member and a shiftable driven clutch member provided with a rotary friction member having an annular beveled friction face, and a manually operated combined clutch shifter and brake including a slidable member having oppositely disposed spaced arms provided with diverging friction faces adapted to engage said beveled face and progressively advance toward the axis of said friction member to shift the driven clutch member away from said driving clutch member.

4. In a clutch device provided with a driving shaft, a driving clutch member fixed to said shaft, and a shiftable driven clutch member loosely surrounding said shaft, a beveled annular friction member secured to said driven clutch member, a manually operated combined clutch shifter and brake including a slidable member having spaced arms adapted to progressively engage said beveled annular friction member to shift the driven clutch member away from said driving clutch member, and means for guiding said combined clutch shifter and brake in a substantially straight line at a right angle to the axis of said driving shaft.

5. In a clutch device provided with a driving shaft, a driving clutch member fixed to said shaft, and a shiftable driven clutch member having a hub loosely surrounding said shaft, said hub being provided with a rotary friction member having an annular beveled face, a manually operated combined clutch shifter and brake including a slidable member having a bifurcated portion providing oppositely disposed spaced arms movable to engage, and progressively advance toward the axis of, said annular beveled face to shift the driven clutch member away from said driving clutch member, and means for guiding said combined clutch shifter and brake in a substantially straight line at a right angle to the axis of said driving shaft.

6. In a clutch device provided with a driving shaft, a driving clutch member fixed to said shaft, and a shiftable driven clutch member having a hub loosely surrounding said shaft, said hub being provided with a rotary friction member having an annular beveled face, a manually operated combined clutch shifter and brake including a slidable member having a bifurcated portion providing oppositely disposed spaced arms having diverging inner edges adapted to engage, and progressively advance toward the axis of, said annular beveled face to shift the driven clutch member away from said driving clutch member, said bifurcated portion also being provided with a beveled braking face conforming to and adapted to engage said annular beveled face of the friction member to prevent rotation thereof, said combined clutch shifter and brake being provided with an extended operating handle for slidably moving said bifurcated portion toward and away from said friction member, means for guiding said combined clutch shifter and brake in a substantially straight line at a right angle to the axis of said driving shaft, and a stop device for limiting the movement of said combined clutch shifter and brake away from the friction member.

shaft having a shoulder and a reduced end portion extending from said shoulder, a driving clutch member fixed to said reduced portion of the shaft, a shiftable driven clutch member having a hub surrounding a reduced portion of the shaft, said hub being provided with a beveled annular friction member, a manually operated 7. In a clutch device provided with a driving combined clutch shifter and brake including a slidable member having a bifurcated portion providing oppositely disposed spaced arms having diverging inner edges adapted to progressively engage said beveled annular friction member to shift the driven clutch member away from said driving clutch member, said spaced arms also being provided with beveled braking faces adjacent said diverging inner edges conforming to and adapted to engage said beveled annular friction member to prevent rotation thereof, means for guiding said clutch shifter and brake in a substantially straight line at a right angle to the axis of said driving shaft, and an anti-friction bearing tending to prevent transmission of rotary movement to the driven clutch member when said combined clutch shifter and brake is actuated to disengage the driven clutch member from the driving clutch member, said anti-friction bearing being interposed between the driven clutch member and the reduced portion of the driving shaft.

8. In a clutch device provided with a driving shaft having a shoulder and a reduced end portion extending from said shoulder, a driving clutch member fixed to said reduced portion of the shaft, a shiftable driven clutch member having a hub surrounding a reduced portion of the shaft, said hub being provided with a beveled annular friction member, a manually operated combined clutch shifter and brake including a slidable member having a bifurcated portion providing oppositely disposed spaced arms having diverging inner edges adapted to progressively engage opposite portions of said beveled annular friction member to shift the driven clutch member away from said driving clutch member, an anti-friction bearing tending to prevent transmission of rotary movement to the driven clutch member when said combined clutch shifter and brake is actuated to disengage the driven clutch member from the driving clutch member, said anti-friction bearing comprising a metal sleeve impregnated with oil surrounding the reduced portion of the driving shaft, one end of said sleeve being provided with a thrust member engaging the shoulder on the driving shaft, said sleeve and driving clutch member being provided with spring seats, and a clutch-shifting spring surrounding said sleeve and interposed between said spring seats so as to force said driven clutch member toward said driving clutch member.

9. In a clutch device provided with a driving shaft having a shoulder and a reduced end portion extending from said shoulder, a driving clutch member fixed to said reduced portion of the shaft, a shiftable driven clutch member having a hub surrounding a reduced portion of the shaft, said hub being provided with a beveled annular friction member at one end thereof and a driven sprocket wheel interposed between said clutch member and friction member, a manually operated combined clutch shifter and brake including a slidable member having a bifurcated portion providing oppositely disposed spaced arms having diverging inner edges adapted to progressively engage diametrically opposite faces of said beveled annular friction member to shift the driven clutch member away from said driving clutch member, said spaced arms also being provided with beveled braking faces adjacent said diverging inner edges conforming to and adapted to engage said beveled annular friction member to prevent rotation thereof, said combined clutch shifter and brake being provided with an extended operating member for slidably moving said bifurcated portion toward and away from said beveled annular friction member, means for guiding said clutch shifter and brake in a substantially straight line at a right angle to the axis of said driving shaft, a stop device for limiting the movement of said clutch shifter and brake away from the beveled annular friction member, an anti-friction bearing tending to prevent transmission of rotary movement to the driven clutch member when said combined clutch shifter and brake is actuated to disengage the driven clutch member from the driving clutch member, said anti-friction bearing comprising a metal sleeve impregnated with oil surrounding the reduced portion of the driving shaft, one end of said sleeve being provided with a thrust member engaging the shoulder on the driving shaft, said sleeve and driving clutch member being provided with spring seats, and a clutch-shifting spring surrounding said sleeve and interposed between said spring seats so as to force said driven clutch member toward said driving clutch member.

JOSEPH C. STEINER.